US010908959B2

(12) United States Patent
Booss et al.

(10) Patent No.: US 10,908,959 B2
(45) Date of Patent: Feb. 2, 2021

(54) MEMORY MANAGEMENT IN A MULTI-THREADED COMPUTING ENVIRONMENT

(71) Applicant: SAP SE, Walldorf (DE)

(72) Inventors: Daniel Booss, Angelbachtal (DE); Robert Kettler, Heidelberg (DE)

(73) Assignee: SAP SE, Walldorf (DE)

( * ) Notice: Subject to any disclaimer, the term of this patent is extended or adjusted under 35 U.S.C. 154(b) by 118 days.

(21) Appl. No.: 16/370,604

(22) Filed: Mar. 29, 2019

(65) Prior Publication Data

US 2020/0310879 A1 Oct. 1, 2020

(51) Int. Cl.
*G06F 9/50* (2006.01)
*G06F 9/48* (2006.01)
*G06F 16/901* (2019.01)
*G06F 9/52* (2006.01)

(52) U.S. Cl.
CPC .......... *G06F 9/5016* (2013.01); *G06F 9/4843* (2013.01); *G06F 9/52* (2013.01); *G06F 16/9024* (2019.01)

(58) Field of Classification Search
CPC ...... G06F 9/5016; G06F 9/52; G06F 16/9024; G06F 9/48
See application file for complete search history.

(56) References Cited

U.S. PATENT DOCUMENTS

| 6,539,464 | B1 * | 3/2003 | Getov | G06F 9/5016 |
| | | | | 711/147 |
| 2002/0199069 | A1 * | 12/2002 | Joseph | G06F 9/5016 |
| | | | | 711/147 |
| 2005/0216691 | A1 * | 9/2005 | Michael | G06F 9/5016 |
| | | | | 711/170 |
| 2007/0100916 | A1 * | 5/2007 | Konecny | G06F 9/5016 |
| 2009/0172336 | A1 * | 7/2009 | Schmidt | G06F 9/5016 |
| | | | | 711/170 |
| 2018/0107514 | A1 * | 4/2018 | Dice | G06F 9/5022 |
| 2019/0235933 | A1 * | 8/2019 | Levandoski | G06F 9/30087 |

\* cited by examiner

*Primary Examiner* — Tuan C Dao
(74) *Attorney, Agent, or Firm* — Mintz Levin Cohn Ferris Glovsky and Popeo, P.C.

(57) ABSTRACT

A computer-implemented method, system or product, the method comprising receiving, by a memory management system, a first memory request from a first thread in a multi-threaded computing environment, the memory request including a target value associated with a size of memory requested by the first thread; in response to receiving the first memory request, retrieving a header referencing a first node in a linked list data structure having a plurality of connected nodes, the header comprising a first pointer value, referring to a free first memory block, and a first size value associated with a size of the first memory block; reading, by way of an atomic operation, the first pointer value and the first size value from the linked list data structure.

20 Claims, 6 Drawing Sheets

MEMORY MANAGEMENT IN A MULTI-THREADED COMPUTING ENVIRONMENT

TECHNICAL FIELD

The disclosed subject matter generally relates to memory management in a computing environment and, more particularly, to an efficient method for managing memory using a linked list data structure.

BACKGROUND

In a multi-threaded computing environment, a plurality of threads typically compete for access to available memory space controlled by a memory management system. To allocate memory space that can accommodate the needs of each thread, a list or data structure may be maintained by the memory management system that tracks or provides the status of available memory. In a conventional memory allocation scenario, if a thread cannot obtain access to memory space that is sufficiently large to satisfy a memory allocation request, the thread will have to wait and try again by submitting additional requests.

For example, a first computing thread may need a first amount of memory space in order to perform a first operation, while a second thread may need a second amount of memory space to perform a second operation. To successfully allocate memory to the first thread, the first thread will first need to submit a request to retrieve the needed memory space. Even in a scenario where the total available memory space is large enough to accommodate both the first thread and the second thread, the second thread's memory allocation request may not be processed, while the first thread's request is being processed.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, computer-implemented methods, systems and products for efficient memory management are provided. The method may comprise receiving, by a memory management system, a first memory request from a first thread in a multi-threaded computing environment, the memory request including a target value associated with a size of memory requested by the first thread; in response to receiving the first memory request, retrieving a header referencing a first node in a linked list data structure having a plurality of connected nodes, the header comprising a first pointer value, referring to a free first memory block, and a first size value associated with a size of the first memory block; reading, by way of an atomic operation, the first pointer value and the first size value from the linked list data structure; and in response to determining that the first size value is equal to or greater than the target value, allocating a first amount of memory equal to the target value to the first thread by splitting a second memory block from an end of the first memory block, the second memory block having a size equal to the target value.

In one aspect, the first memory request is processed as an atomic operation by one or more processors in relation to a second thread being executed in parallel with the first thread and the second thread submits a second memory request for accessing the first memory block referenced by the first pointer in the linked list data structure. After splitting the second memory block from the end of the first memory block, the first pointer value remains unchanged, such that the first pointer continues to point to the first memory block. In response to splitting the second memory block from the end of the first memory block, the first size value in the linked list data structure is reduced by the target value.

In one or more implementations, in response to receiving, by the memory management system, a second memory request from a second thread, the first size value in the linked list data structure is further reduced by amount of memory needed to satisfy the second memory request. In response to receiving, by the memory management system, additional memory requests from other threads being executed in parallel with the first thread, the first size value in the linked list data structure is further reduced by amount of memory needed to satisfy the additional memory requests, until the first size value is no longer large enough to satisfy additional memory requests. The first memory block has a first end and a second end, the second memory block being split from the second end of the first memory block, the second end of the first memory block is on an opposite end of the first end and the first end of the first memory block is referenced by the first pointer value.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
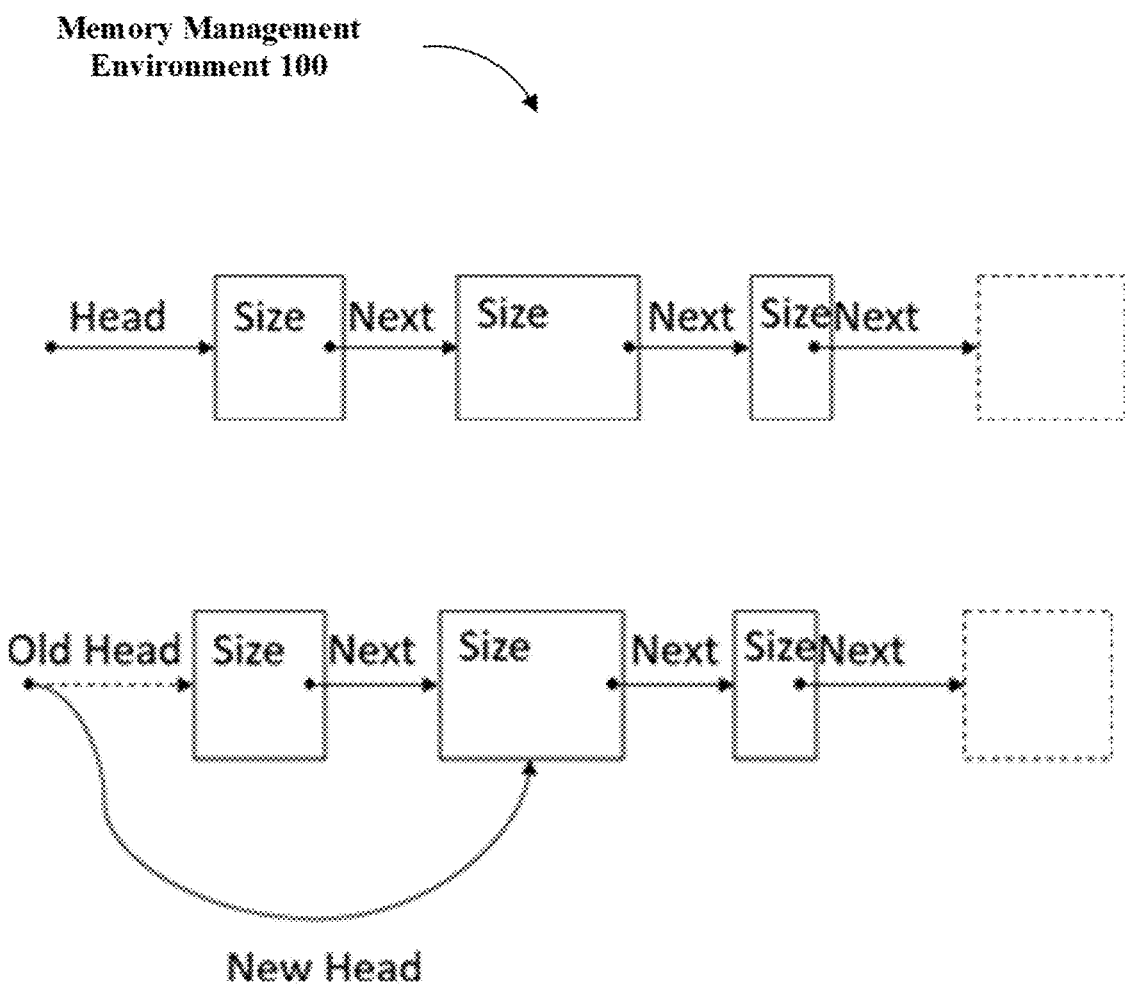
FIG. 1 illustrates an example computing operation in a memory management environment, in accordance with one or more embodiments.

Referring to FIG. 1, a memory management environment 100 is provided in which one or more data structures are implemented to control and enable memory allocation and deallocation in a multi-threaded parallel execution computing environment. In an example implementation, the data structure utilized for the purpose of maintaining access to contiguous or non-contiguous memory blocks may be a linked list (or data array) with elements (i.e., nodes) that include pointers to locations or addresses in memory where data may be stored.

As shown in the upper portion of FIG. 1, a linked list of nodes may include an origination reference (e.g., a header pointer) that refers to a first node in the linked list. The first node may include a first pointer that refers to a second node. The second node may include a second pointer that refers to a third node and so on. The last node in the linked list may refer to a predetermined value (e.g., null) indicating the end of the list. Depending on implementation, the nodes in the linked list, in addition to the pointers to the next node, may also include a variable that may be assigned to a value, such that the value represents the size of memory space (e.g., a memory block) associated with the corresponding node.

As shown in the lower portion of FIG. 1, a memory space manager component in memory management environment 100 may be configured to manage memory allocation and deallocation based on requests received from one or more threads in a multi-threaded computing environment. When memory space associated with a node in the linked list is no longer free, one or more pointers (e.g., the head pointer pointing to a node at the head of the linked list) may be updated to point to a new node (e.g., a new head node in the linked list) dropping the old head node from the list. As provided in further detail herein, to allow for accurate and efficient memory management, certain criteria may be followed to ensure that multiple threads that request access to a certain memory space at the same time are serviced without one thread having to wait for an undesirable amount of time, while the other threads' requests are being processed.

Figure 2:
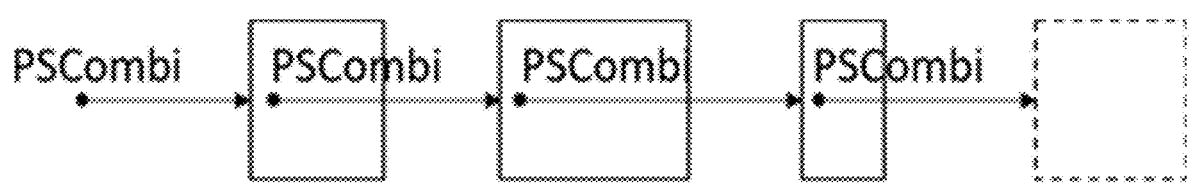
FIGS. 2 through 4 are block diagrams of example computing data structures for memory allocation, in accordance with one or more embodiments or implementations.

Referring to FIG. 2, to accomplish an efficient memory management system and process, particularly when multiple threads compete for allocation of memory that spans a large contiguous free memory area (e.g., a large memory block), a linked list may be implemented in which a pointer included in a node in the linked list may be read together (e.g., atomically) with the size of memory block to which the pointer refers. In other words, a memory request operation by a thread may be made atomic, such that the memory request operation completes in, for example, a single step relative to other threads requesting access to the same memory space.

Due to the architecture of certain processors or processing platforms, non-atomic memory operations may exact a toll on the efficiency of a multi-threaded environment, particularly when multiple threads are waiting for another thread's memory requests to be completed. In example embodiments, when a first thread submits a request for access to shared memory, an atomic operation may be performed to read a pointer value and the size associated with a target node from the linked list, desirably simultaneously. The target node in the linked list may be associated with the free area in the shared memory space for which multiple threads, including the first thread, are competing.

In comparison with a non-atomic operation, which may require multiple computing instructions or processor clock cycles, an atomic operation may be implemented by way of a single computing instruction or performed in a single processor clock cycle (or other defined slice in execution time). In accordance with certain aspects, utilizing an atomic operation, the respective pointer and size values for a target node in the linked list may be advantageously loaded and read during the same processor (e.g., CPU) clock cycle, for example, by way of a single operation or instruction. In this manner, other competing threads do not have to suffer from inefficiencies associated with non-atomic operations, when a memory allocation request is submitted, such as waiting for multiple processor clock cycles while the first thread is looking up, loading and executing the respective memory allocation related instructions.

In one or more embodiments, a linked list with an end-splitting data structure for a memory block may be used to satisfy memory requests using atomic operations. For example, when a thread submits a memory request of a certain block size, the atomic operation may access the linked list, retrieve the size indicated according to the size value stored in a target node (e.g., a head node), and check if the size indicated in the node is larger than the requested size. If the available memory space is insufficient, the request may be denied and other threads may continue to submit requests for the free shared memory space without having to wait. If the available memory space is larger than requested, the corresponding memory area (e.g., one or more memory blocks) may be split so that the request is satisfied, and the rest of the split memory block or blocks are put back into the linked list to satisfy memory requests submitted by other threads.

Depending on implementations, a variety of modifications and enhancements to the above memory allocation operations are possible. For example, in one or more embodiments, in a scenario when multiple concurrently executed threads compete for a small number of large blocks, the atomic operation and structural features disclosed above with respect to FIG. 2 may be combined to advantageously help more efficient memory allocation as provided in further detail herein with reference to FIGS. 3 through 5. It is noteworthy that the example scenarios provided are for the purpose of illustration and are not to be construed as limiting or narrowing the scope of the disclosed subject matter to any particular details, scenarios or embodiments.

In a first example scenario, 10 threads may need to satisfy memory requests of 1 GB each. The linked list may indicate that 20 blocks of memory are free or available. Assuming that each block is 2 GB in size (i.e., a total of 40 GB of memory is available) and all 10 threads try to retrieve the first node from the linked list, if Thread 1 retrieves the first node (e.g., a head node), other threads would have to retry. A 2 GB block may be split in two to satisfy the 1 GB memory request by Thread 1. Continuing on, the old head node may be replaced by a new head node as provided earlier. Thread 2 may retrieve another node (e.g., the new head node) from the linked list while other threads retry. Meanwhile, Thread 1 may put back 1 GB of memory on the linked list. This allocation process may continue until the remaining requests for the 10 threads are satisfied. In this example scenario, because at each instance the amount of memory referenced by each node in the linked list is at least greater than or equal to the amount of memory requested by each threads, there will be no out of memory situation.

Figure 3:
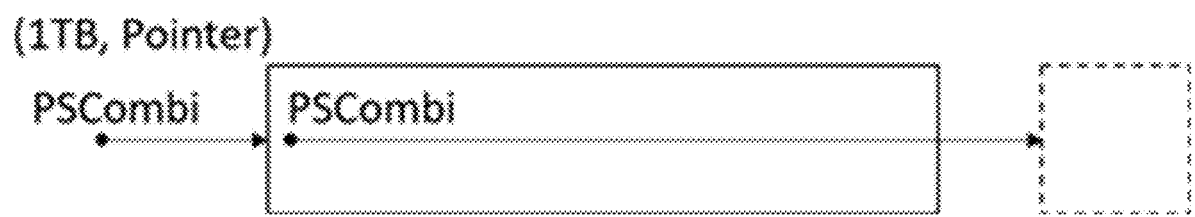

Referring to FIG. 3, in a second example scenario, instead of several small free blocks of shared memory, a singular large block of memory may be managed by the linked list. As shown, such a memory block may, for example, be associated with 1 TB of free shared memory space. Assuming the same or a similar request size and number of threads as that provided in the first example scenario in FIG. 2, 10 threads might try to retrieve the first node on the linked list in order to satisfy the respective memory allocation requirements for each thread. If Thread 2 retrieves a first node, other threads may retry. Because the size of the 1 TB memory block is too large for the submitted memory request by Thread 2, the memory manager may split the 1 TB block into a 999 GB block and a 1 GB block to satisfy Thread 2's request.

Figure 4:
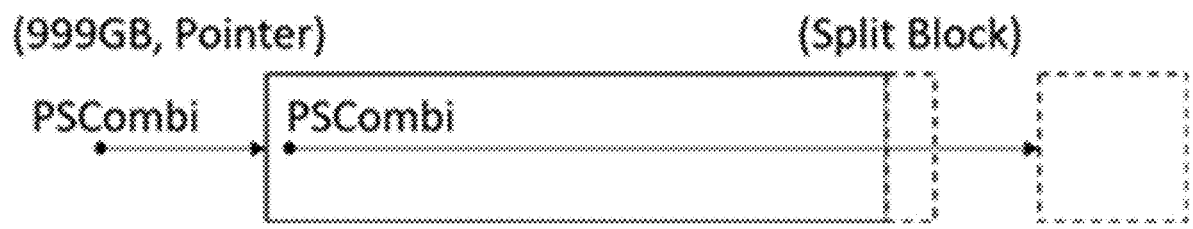

Referring to FIG. 4, once the requested 1 GB of memory is allocated to Thread 2, the remaining 999 GB memory block is returned to the linked list, while other threads retry. Thread 1 may retrieve a node from the linked list while other threads retry. For clarity, were Thread 1 to use a non-atomic operation, in this scenario, while Thread 3 tries to retrieve a memory block, the linked list may seem empty (i.e., out of memory), even though enough memory was available to satisfy requests by both Threads 1 and Thread 3. Such out of memory scenario would arise due to the target block (i.e., a single large block of memory) having been already retrieved by Thread 1 and taken off the linked list, while a non-atomic operation for memory allocation persists.

In contrast, when Thread 1 uses an atomic operation to retrieve a block of memory, Thread 1 reads the pointer and size associated with the free block of memory (e.g., the PSCombi of the target block) from the linked list in one step (e.g., in one clock cycle). In this manner, the other threads do not have to wait beyond a single clock cycle to determine whether the target memory block is available for allocation. In one or more embodiments, if the target block needs to be split (e.g., because the target block is larger than that requested by Thread 1), the memory management system may split the target block by changing the PSCombi of the block, during the atomic operation, by decreasing the size for the block (e.g., from 1 TB to 999 GB), while maintaining the same pointer value to the same node, which is now smaller in size than before the atomic operation was performed to service the memory request by Thread 1.

Referring back to FIG. 4, reducing the size element of the head PSCombi to 999 GB provides an indication to the memory management system that the entire 1 TB block is no longer available. As shown, head PSCombi pointer element remains pointing to the same address. Accordingly, in one implementation, instead of changing the head pointer to remove a block from the beginning of the target block (e.g., for the purpose of allocating memory to a requesting thread), memory space at the end portion of the block is used to satisfy a thread's request. As the above steps take place in an atomic operation, other threads observing the linked list will see a head pointer to a node in the list that references a memory block with free space, until the free space is fully allocated as the pointer size is reduced. Once the free block is fully allocated, the head pointer may be directed to point to a next node in the linked list referencing a free memory block, or to a null reference, for example, if no more free memory blocks are available.

Figure 5:
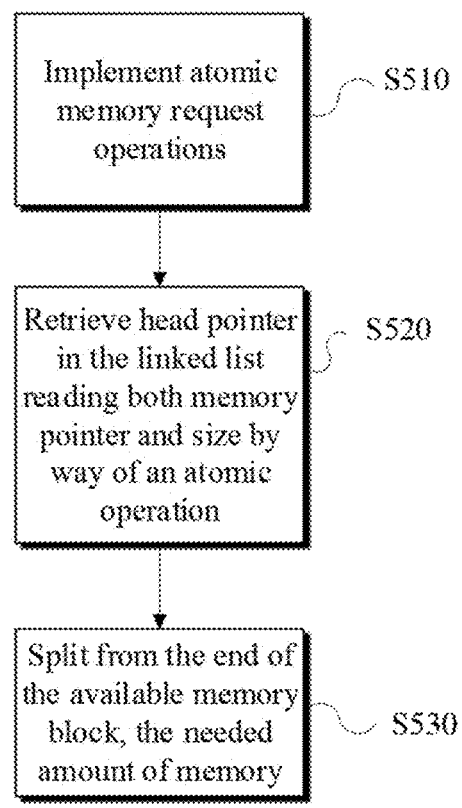
FIG. 5 is a block diagram of an example process for allocating memory, in accordance with one or more embodiments.

Referring to FIG. 5, in accordance with one or more embodiments, atomic memory request operations may be implemented (S510), desirably in combination with a structural implementation for splitting the end of the memory block for memory allocation. Using such implementation, a single large block of memory (e.g., 1 TB) may be referenced by a head pointer in the linked list that indicates both the location and size of the large block of memory. A thread requesting memory space may retrieve the head pointer in the linked list and read the combination memory pointer and block size parameters (i.e., PSCombi) by way of an atomic operation (S520). If the size of memory requested by the thread (e.g., 1 GB) is smaller than the available memory the block referenced by the pointer, then needed amount of memory may be split off from the end of the available memory block (e.g., 1 GB split out of 1 TB block) leaving a 999 GB block (S530). The above steps may be repeated (e.g., Thread 3 may split the 999 GB block, taking 1 GB and leaving 998 GB) until the pending memory requests are satisfied.

Accordingly, a linked list with a combined pointer-size (i.e., P SCombi) implementation may be provided such that the pointer and the size of a target memory block (e.g., a large free block of memory) may be read during an atomic operation, so that a needed memory block of the requested size may be split from the end of the target memory block by simply reducing the size parameter associated with the target memory block by the amount of memory allocated during the atomic operation. Such implementation helps keep the target memory block visible to other threads by way of the linked list pointer structure. The disclosed implementations and embodiments obviate the inefficiencies associated with the conventional memory allocation systems and data structures, which implement the pointer to the next memory block at the end of the nodes in the linked list, while requiring non-atomic (i.e., multi-step) memory operations to retrieve the respective nodes first and determine the size of the reference memory block later.

Figure 6:
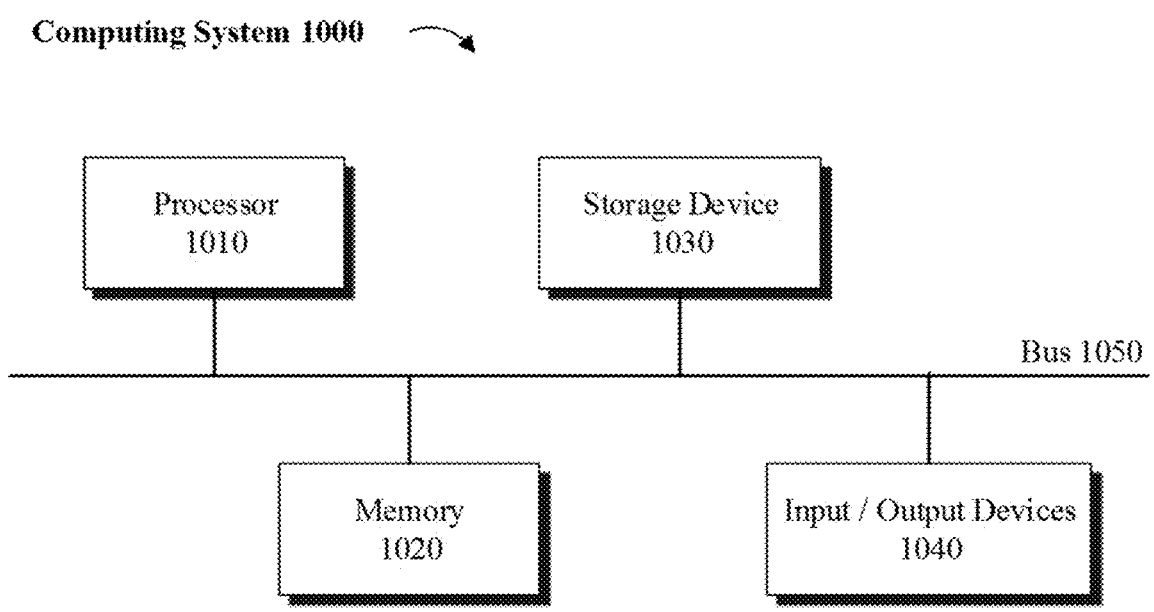
FIG. 6 is a block diagram of an example computing system that may be utilized to perform one or more computing operations or processes as consistent with one or more disclosed features.

Referring to FIG. 6, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 6, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent documents or the patent disclosure, as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method comprising:
   receiving, by a memory management system, a first memory request from a first thread in a multi-threaded computing environment, the memory request including a target value associated with a size of memory requested by the first thread;
   in response to receiving the first memory request, retrieving a header referencing a first node in a linked list data structure having a plurality of connected nodes, the header comprising a first pointer value, referring to a free first memory block, and a first size value associated with a size of the first memory block;
   reading, by way of an atomic operation, the first pointer value and the first size value from the linked list data structure; and
   in response to determining that the first size value is equal to or greater than the target value, allocating a first amount of memory equal to the target value to the first thread by splitting a second memory block from an end of the first memory block, the second memory block having a size equal to the target value.

2. The method of claim 1, wherein the first memory request is processed as an atomic operation by one or more processors in relation to a second thread being executed in parallel with the first thread.

3. The method of claim 2, wherein the second thread submits a second memory request for accessing the first memory block referenced by the first pointer in the linked list data structure.

4. The method of claim 1, wherein after splitting the second memory block from the end of the first memory block, the first pointer value remains unchanged, such that the first pointer continues to point to the first memory block.

5. The method of claim 1, wherein in response to splitting the second memory block from the end of the first memory block, the first size value in the linked list data structure is reduced by the target value.

6. The method of claim 5, wherein in response to receiving, by the memory management system, a second memory request from a second thread, the first size value in the linked list data structure is further reduced by amount of memory needed to satisfy the second memory request.

7. The method of claim 6, wherein in response to receiving, by the memory management system, additional memory requests from other threads being executed in parallel with the first thread, the first size value in the linked list data structure is further reduced by amount of memory needed to satisfy the additional memory requests, until the first size value is no longer large enough to satisfy additional memory requests.

8. The method of claim 1, wherein the first memory block has a first end and a second end, the second memory block being split from the second end of the first memory block.

9. The method of claim 8, wherein the second end of the first memory block is on an opposite end of the first end.

10. The method of claim 9, wherein the first end of the first memory block is referenced by the first pointer value.

11. A system comprising:
    at least one programmable processor; and
    a non-transitory machine-readable medium storing instructions that, when executed by the at least one programmable processor, cause the at least one programmable processor to perform operations comprising:
    receiving, by a memory management system, a first memory request from a first thread in a multi-threaded computing environment, the memory request including a target value associated with a size of memory requested by the first thread;
    in response to receiving the first memory request, retrieving a header referencing a first node in a linked list data structure having a plurality of connected nodes, the header comprising a first pointer value, referring to a free first memory block, and a first size value associated with a size of the first memory block;
    reading, by way of an atomic operation, the first pointer value and the first size value from the linked list data structure; and
    in response to determining that the first size value is equal to or greater than the target value, allocating a first amount of memory equal to the target value to the first thread by splitting a second memory block from an end of the first memory block, the second memory block having a size equal to the target value.

12. The system of claim 11, wherein the first memory request is processed as an atomic operation by one or more processors in relation to a second thread being executed in parallel with the first thread.

13. The system of claim 12, wherein the second thread submits a second memory request for accessing the first memory block referenced by the first pointer in the linked list data structure.

14. The system of claim 11, wherein after splitting the second memory block from the end of the first memory block, the first pointer value remains unchanged, such that the first pointer continues to point to the first memory block.

15. The system of claim 11, wherein in response to splitting the second memory block from the end of the first memory block, the first size value in the linked list data structure is reduced by the target value.

16. A computer program product comprising a non-transitory machine-readable medium storing instructions that, when executed by at least one programmable processor, cause the at least one programmable processor to perform operations comprising:
    receiving, by a memory management system, a first memory request from a first thread in a multi-threaded computing environment, the memory request including a target value associated with a size of memory requested by the first thread;

in response to receiving the first memory request, retrieving a header referencing a first node in a linked list data structure having a plurality of connected nodes, the header comprising a first pointer value, referring to a free first memory block, and a first size value associated with a size of the first memory block;

reading, by way of an atomic operation, the first pointer value and the first size value from the linked list data structure; and in response to determining that the first size value is equal to or greater than the target value, allocating a first amount of memory equal to the target value to the first thread by splitting a second memory block from an end of the first memory block, the second memory block having a size equal to the target value, the first pointer value remaining unchanged, such that the first pointer continues to point to the first memory block and the first size value in the linked list data structure is reduced by the target value.

17. The computer program product of claim 16, wherein the first memory request is processed as an atomic operation by one or more processors in relation to a second thread being executed in parallel with the first thread.

18. The computer program product of claim 16, wherein the first memory block has a first end and a second end, the second memory block being split from the second end of the first memory block, the second end of the first memory block being on an opposite end of the first end, and the first end of the first memory block being referenced by the first pointer value.

19. The computer program product of claim 16, wherein in response to receiving, by the memory management system, a second memory request from a second thread, the first size value in the linked list data structure is further reduced by amount of memory needed to satisfy the second memory request.

20. The computer program product of claim 16, wherein in response to receiving, by the memory management system, additional memory requests from other threads being executed in parallel with the first thread, the first size value in the linked list data structure is further reduced by amount of memory needed to satisfy the additional memory requests, until the first size value is no longer large enough to satisfy additional memory requests.

* * * * *